United States Patent
Langenfeld

(10) Patent No.: US 10,059,313 B1
(45) Date of Patent: *Aug. 28, 2018

(54) HYDRAULIC MOTOR HAVING A DUAL BRAKE SYSTEM

(71) Applicant: Hydro-Gear Limited Partnership, Sullivan, IL (US)

(72) Inventor: Thomas J. Langenfeld, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 220 days.

This patent is subject to a terminal disclaimer.

(21) Appl. No.: 14/984,007

(22) Filed: Dec. 30, 2015

Related U.S. Application Data

(63) Continuation of application No. 13/680,543, filed on Nov. 19, 2012, now Pat. No. 9,371,842.

(60) Provisional application No. 61/561,090, filed on Nov. 17, 2011.

(51) Int. Cl.

| | |
|---|---|
| *F16H 61/4157* | (2010.01) |
| *B60T 1/06* | (2006.01) |
| *B60T 7/04* | (2006.01) |
| *B60K 3/00* | (2006.01) |
| *B62D 11/04* | (2006.01) |
| *F02D 13/04* | (2006.01) |

(52) U.S. Cl.
CPC ............... *B60T 1/062* (2013.01); *B60K 3/00* (2013.01); *B60T 7/04* (2013.01); *B62D 11/04* (2013.01); *F02D 13/04* (2013.01); *F16H 61/4157* (2013.01)

(58) Field of Classification Search
CPC .............................. F16H 61/4157; B60T 1/062

USPC .................. 60/435, 442, 487, 466; 74/606 R
See application file for complete search history.

(56) References Cited

U.S. PATENT DOCUMENTS

| | | |
|---|---|---|
| 362,491 A | 5/1887 | Carpenter |
| 3,819,016 A | 6/1974 | Radcliffe et al. |
| 3,838,710 A | 10/1974 | Reip |
| 4,280,595 A | 6/1981 | Timms et al. |
| 4,342,256 A | 8/1982 | Andersen et al. |
| 4,785,714 A | 11/1988 | Tamada et al. |
| 4,845,949 A | 7/1989 | Shivvers et al. |
| 5,113,977 A | 5/1992 | Ridings et al. |
| 5,386,742 A | 2/1995 | Irikura et al. |
| 5,421,434 A | 6/1995 | Liao |
| 5,794,443 A | 8/1998 | Shimizu |
| 6,170,615 B1 | 1/2001 | Cheung |
| 6,179,092 B1 | 1/2001 | Naakgeboren et al. |

(Continued)

OTHER PUBLICATIONS

Seatrax, "Fail-Safe Hoist Features," STDFM-156, Rev. 1, Jul. 16, 2010, pp. 1-4.
U.S. Appl. No. 14/885,336, filed Oct. 16, 2015.

*Primary Examiner* — F. Daniel Lopez
*Assistant Examiner* — Daniel Collins
(74) *Attorney, Agent, or Firm* — Neal, Gerber & Eisenberg LLP

(57) ABSTRACT

A hydraulic drive unit for use in a vehicle or other application incorporates a motor disposed in a housing and connected to a pump through a porting system, and an output shaft driven by the motor. A mechanical brake is used to brake the motor, while a valve provides a hydraulic brake for preventing flow between the hydraulic motor and the hydraulic pump. A brake actuator is connected to both the mechanical brake and the hydraulic brake, whereby actuation of the brake actuator causes both the mechanical brake and the hydraulic brake to be actuated.

21 Claims, 15 Drawing Sheets

(56) References Cited

U.S. PATENT DOCUMENTS

| | | |
|---|---|---|
| 6,220,289 B1 | 4/2001 | Zenker et al. |
| 6,247,494 B1 | 6/2001 | Deininger |
| 6,220,288 B1 | 8/2001 | Sandau et al. |
| 6,427,721 B1 | 8/2002 | Zenker et al. |
| 6,499,505 B2 | 12/2002 | Zenker et al. |
| 6,701,825 B1 | 3/2004 | Langenfeld |
| 6,722,477 B1 | 4/2004 | Wolfsteiner et al. |
| 6,986,363 B1 | 1/2006 | Trimble et al. |
| 7,134,276 B1 | 11/2006 | Langenfeld et al. |
| 9,163,724 B1 | 10/2015 | Langenfeld |

HYDRAULIC MOTOR HAVING A DUAL BRAKE SYSTEM

CROSS-REFERENCE TO RELATED APPLICATION

This application is a continuation of U.S. patent application Ser. No. 13/680,543, filed Nov. 19, 2012, which claims the benefit of Provisional Application Ser. No. 61/561,090, filed Nov. 17, 2011. The terms of these prior applications are incorporated herein by reference in their entirety.

BACKGROUND OF THE INVENTION

This invention relates to a hydraulic drive assembly that is capable of hydraulic braking and can be used in drive systems, such as a hydraulic motor or transmission for use in a vehicle. This invention further relates to a hydraulic drive assembly having a mechanical brake that can be used to brake the output of the drive assembly in conjunction with a hydraulic brake.

SUMMARY OF THE INVENTION

The drive assembly disclosed herein is depicted as a hydraulic motor designed to be driven by a separate hydraulic pump via fluid lines or hoses connecting the pump and motor. Valves disposed in hydraulic porting formed in the motor's housing can be closed by manipulation of a brake arm via a control linkage to block fluid flow to and from the hydraulic motor. Blocking this fluid flow causes dynamic, hydraulic braking of the hydraulic motor and an axle linked to the hydraulic motor.

The following disclosure further provides a mechanical brake that is actuated by manipulation of the same brake arm that actuates the hydraulic brake. The mechanical brake engages after hydraulic braking has slowed rotation of the axle sufficiently to allow engagement of a brake member with a recess formed on a cylinder block, and the mechanical brake is particularly useful as a parking brake for a vehicle.

While the primary embodiment is depicted as a stand-alone hydraulic motor, it will be understood that the inventions disclosed herein may be used in connection with other hydraulic drives, such as a transaxle assembly, and in connection with vehicles having two such transaxle assemblies for zero-turn drive capabilities. Other non-vehicular applications of the hydraulic drive assembly disclosed herein will be known to those of ordinary skill in the art.

A better understanding of the objects, advantages, features, properties and relationships of the invention will be obtained from the following detailed description and accompanying drawings which set forth an illustrative embodiment and is indicative of the various ways in which the principles of the invention may be employed.

DETAILED DESCRIPTION OF THE INVENTION

Figure 1:
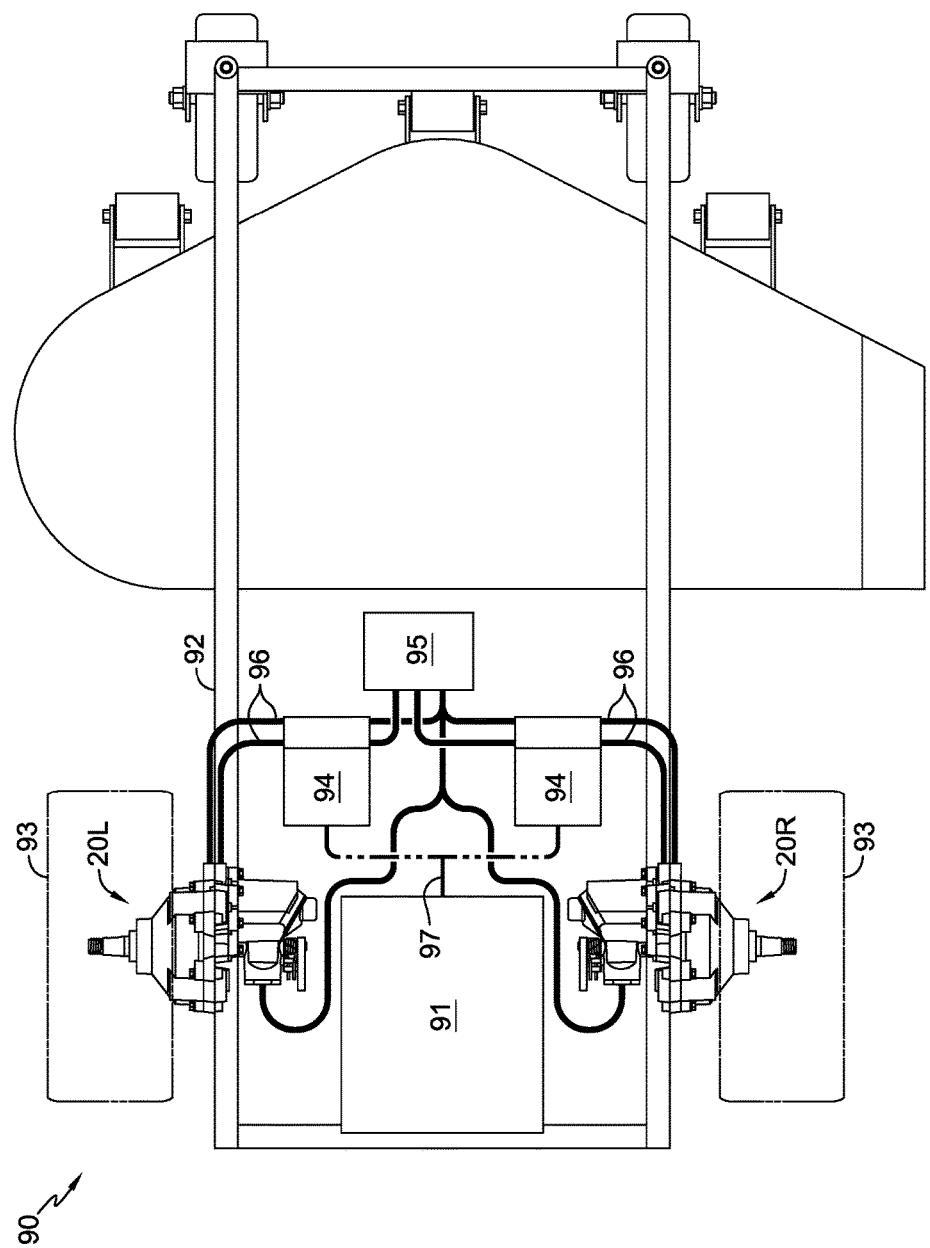
FIG. 1 illustrates a partially schematic, top plan view of a zero-turn vehicle incorporating two hydraulic motor assemblies of the invention.

The description that follows describes, illustrates and exemplifies one or more embodiments of the present invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, the present specification is intended to be taken as a whole and interpreted in accordance with the principles of the present invention as taught herein and understood by one of ordinary skill in the art. It will be further understood that for clarity in certain cross-sectional views, certain elements are not shown in cross-section, as doing so would not assist in the understanding of the invention.

The illustrated embodiment of the motor assembly disclosed herein is a sealed unit which may be oriented in any position, depending on the vehicle or other non-vehicular configuration to which it is applied. However, for the purposes of this description, position and orientation terms such as top, bottom, upper, lower, vertical, horizontal, etc., will be applied to motor assembly 20R mounted on vehicle 90 in its normal orientation as shown in FIG. 1 unless otherwise stated herein. Reference is also made to commonly owned application Ser. No. 13/659,350 by the same inventor and filed Oct. 24, 2012, the terms of which are incorporated herein in their entirety.

Figure 2:
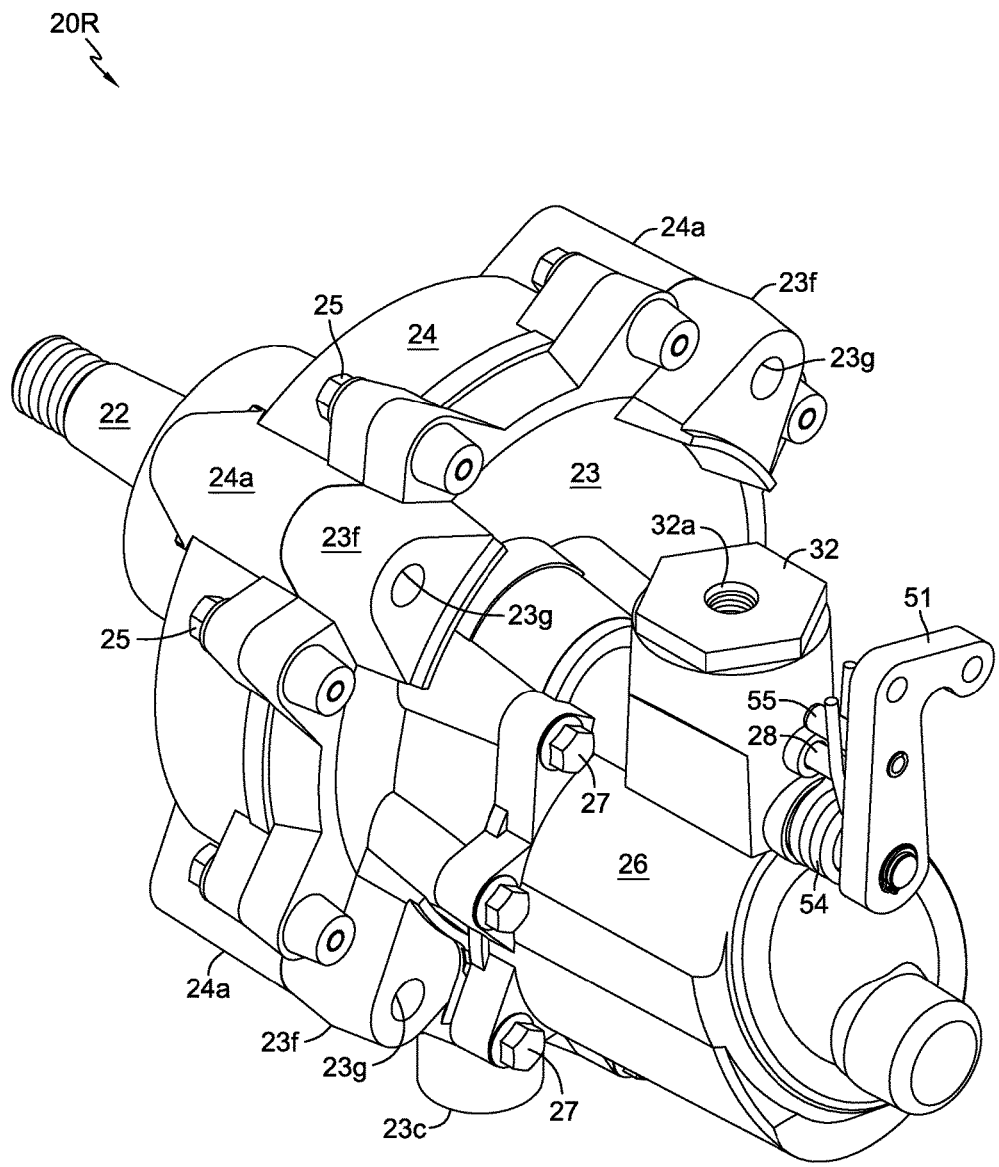
FIG. 2 illustrates a perspective view of one of the motor assemblies shown in FIG. 1.

As shown in FIG. 1, the motor assembly depicted herein can be used in tandem in connection with a zero turn vehicle. FIG. 1 depicts vehicle 90 having hydraulic motor assemblies 20L and 20R. FIG. 2 depicts the external view of one of these hydraulic motor assemblies, 20R, with the understanding that motor assembly 20L can be identical or substantially identical in construction and form. Hydraulic motor assemblies 20L and 20R are mounted to frame 92 by fasteners (not shown) extending through mounting lugs 23f and 24a, and each motor assembly independently drives a wheel 93. It will be understood that the motor assembly described herein can also be used as a single unit for other applications.

Prime mover 91 provides power through a power transfer assembly, such as a belt and pulley assembly 97 (shown schematically), to drive a pair of hydraulic pumps 94. Pumps 94 draw hydraulic fluid from reservoir 95 as needed and pump hydraulic fluid to drive the motor assemblies 20L and 20R. A hydraulic circuit is formed between each motor assembly 20L, 20R and its respective pump 94, with hydraulic fluid flowing through each pair of hoses 96. Blocking the flow in these hydraulic circuits, as described in detail below, causes hydraulic braking of the motor assemblies 20L and 20R. A brake control linkage (not shown) is connected to each brake arm 51 to control a dual brake mechanism 50, shown in detail in FIGS. 7 and 8.

Figure 3:
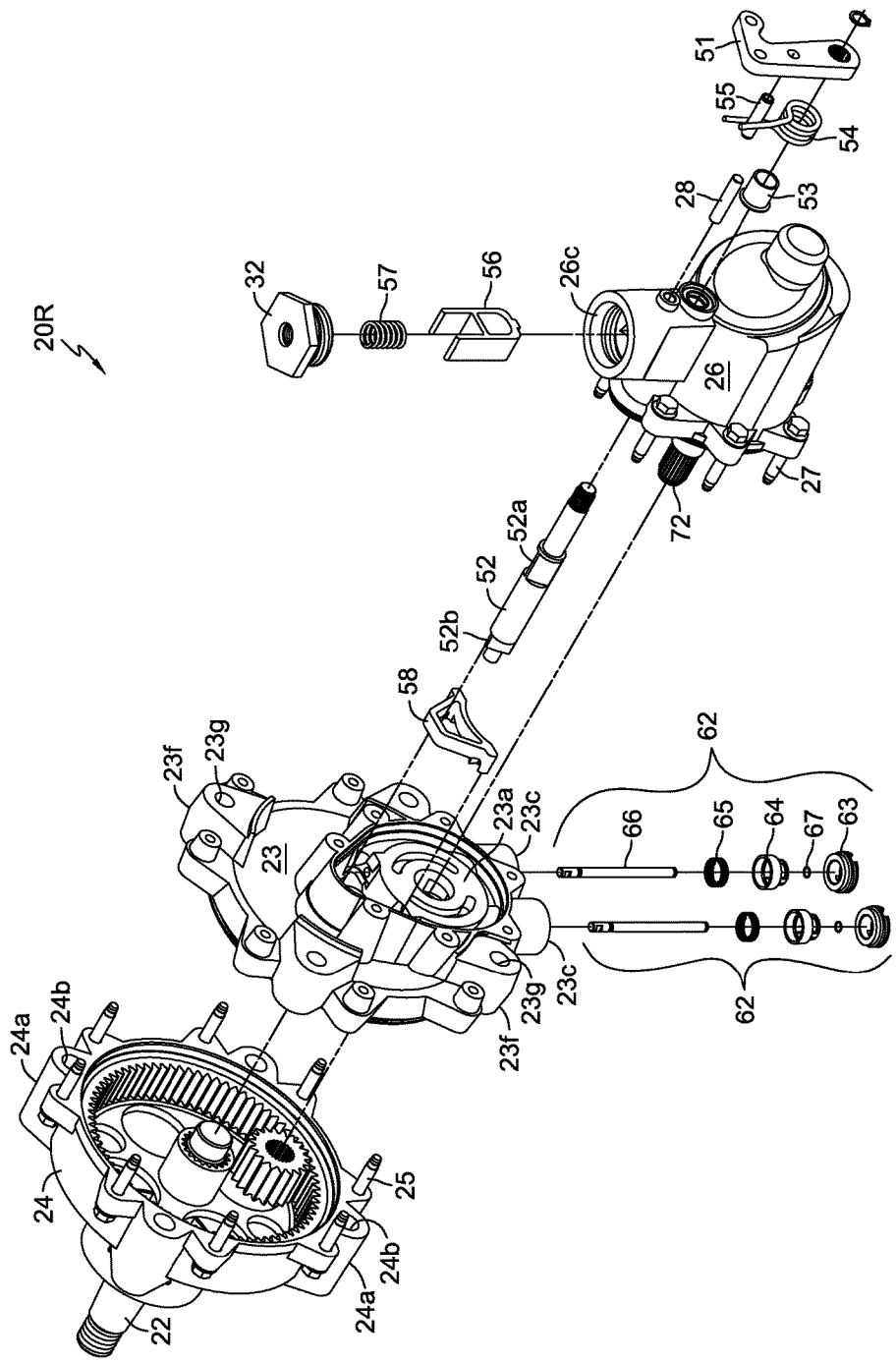
FIG. 3 illustrates an exploded view of the motor assembly shown in FIG. 2.
Figure 4:
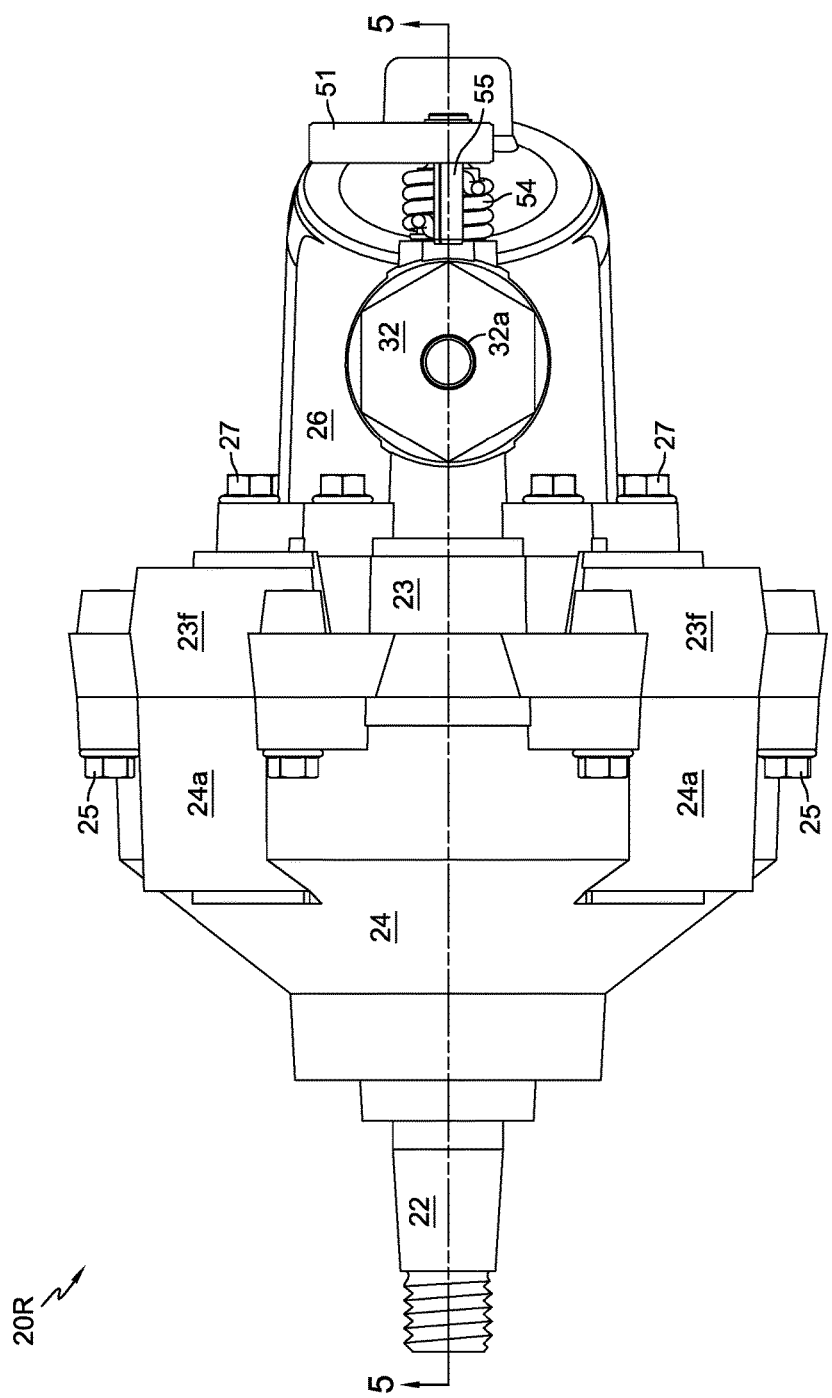
FIG. 4 illustrates a rear elevational view of the motor assembly shown in FIG. 2.
Figure 5:
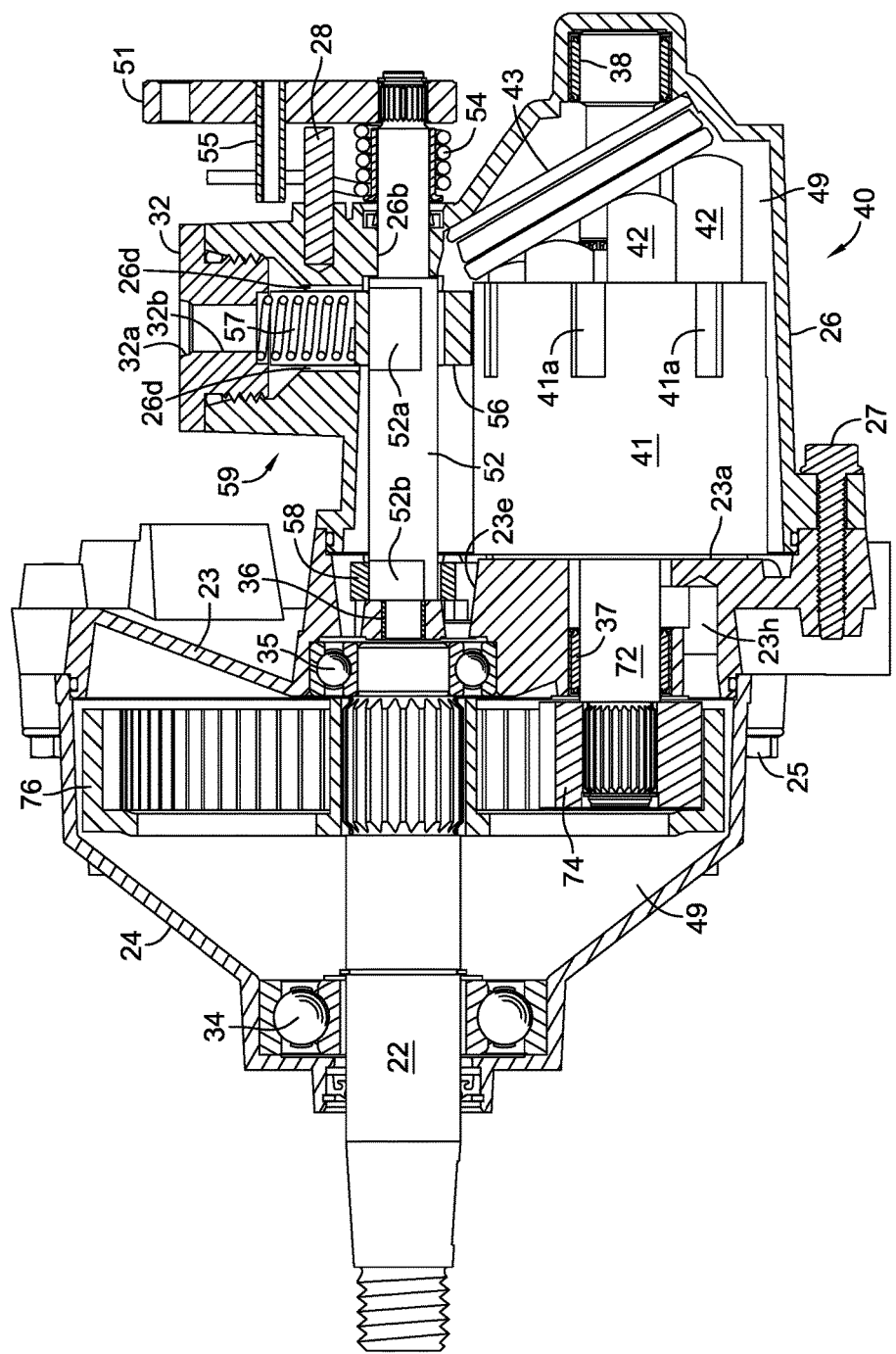
FIG. 5 illustrates a cross-sectional view of the motor assembly shown in FIG. 4, taken along line 5-5.
Figure 6:
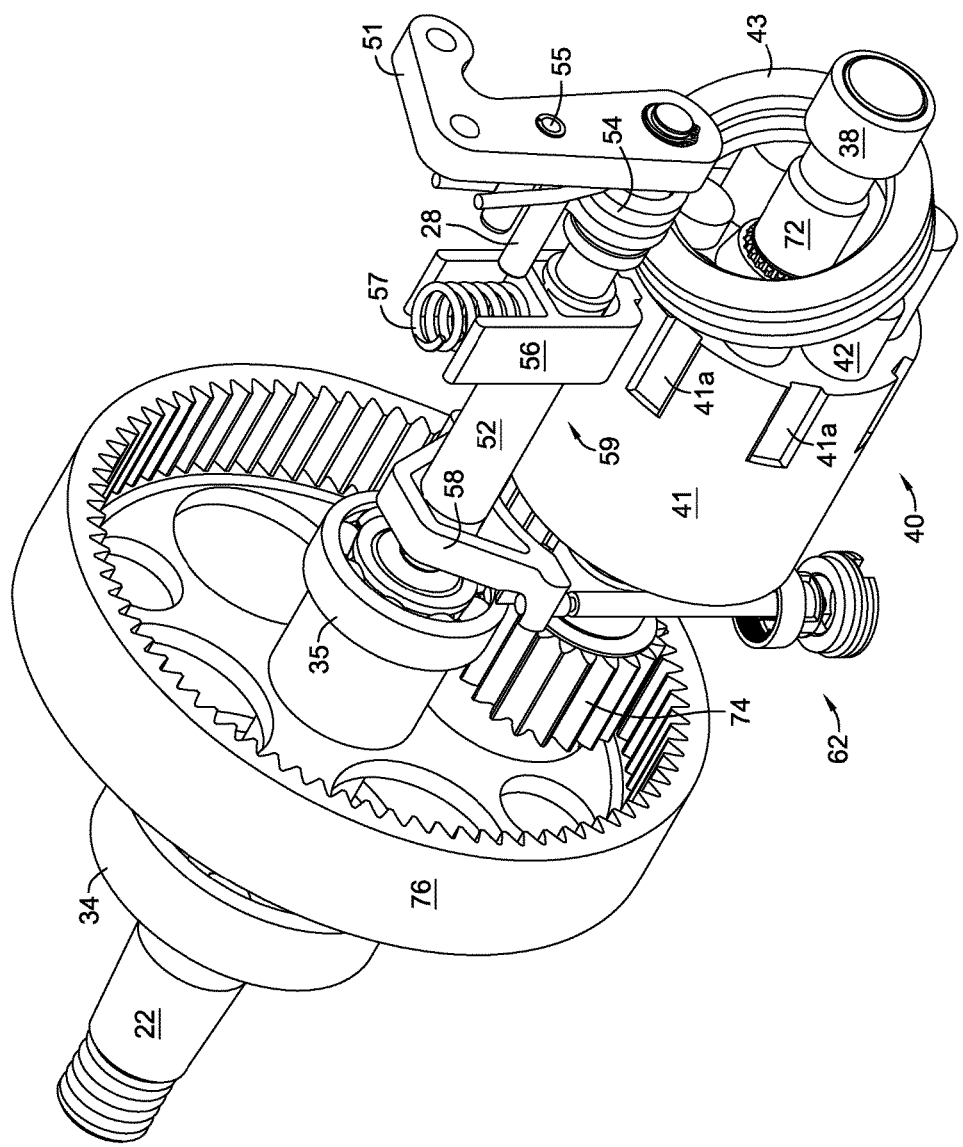
FIG. 6 illustrates a perspective view of internal components of the motor assembly shown in FIG. 2.

Referring to FIGS. 2, 3, and 5, hydraulic motor assembly 20R has cylinder block housing 26 secured to main housing 23 by fasteners 27. Axial piston motor 40 is disposed in cylinder block housing 26 and runs on motor running surface 23a. Axial piston motor 40 has pistons 42 which reciprocate in cylinder block 41. Pistons 42 have ends that bear against thrust bearing 43 to cause rotation of cylinder block 41 which is slidingly engaged to the motor output shaft 72. The opposite ends (not shown) of pistons 42 are open and communicate with kidney ports 23b in motor running surface 23a. When hydraulic pressure spikes occur during operation of axial piston motor 40, relief passage 23h allows hydraulic fluid to pass into sump 49 to avoid lifting cylinder block 41 off the motor running surface 23a.

Figure 10:
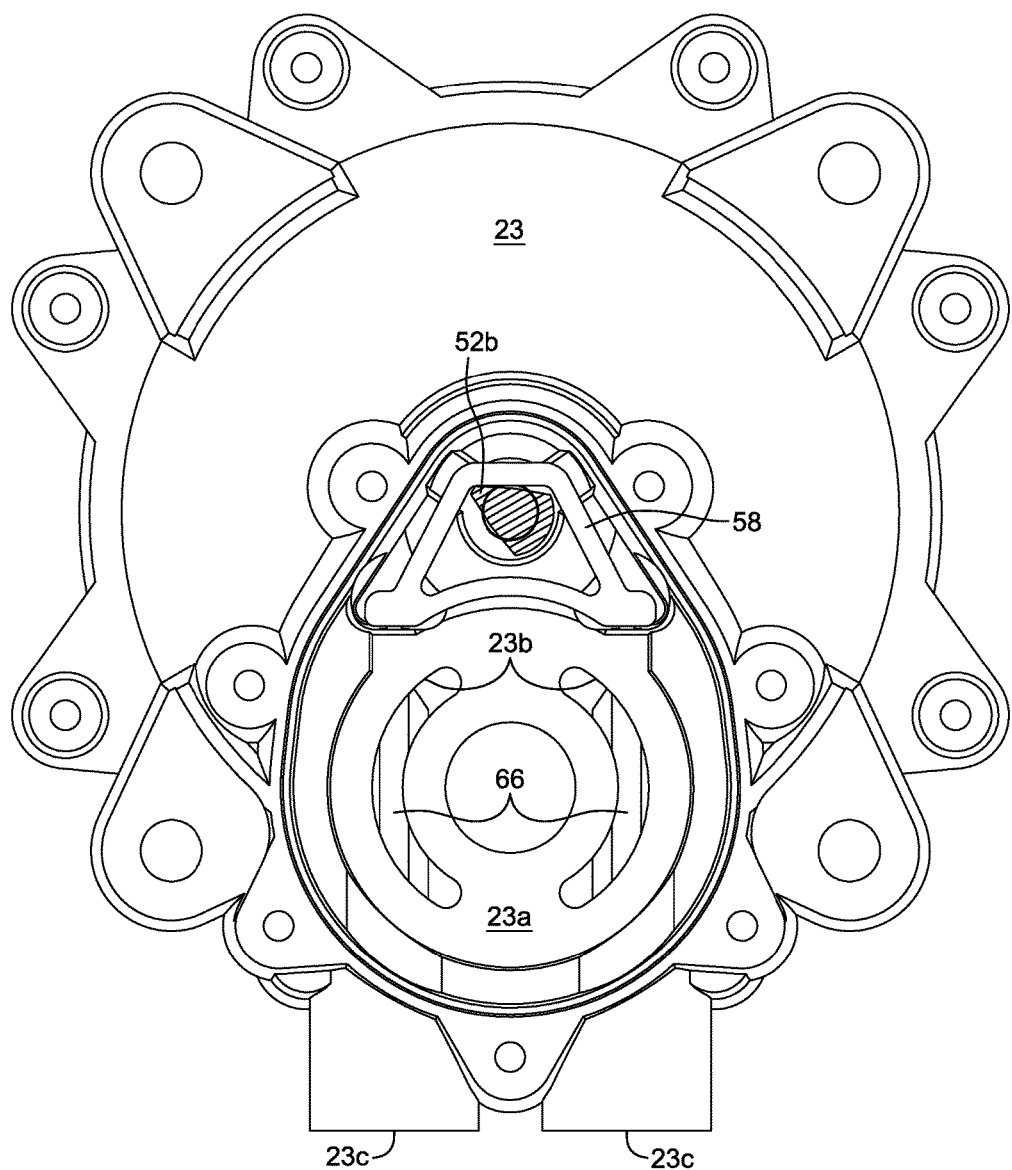
FIG. 10 illustrates an end view identical to FIG. 9, except with the dual brake mechanism engaged.
Figure 11:
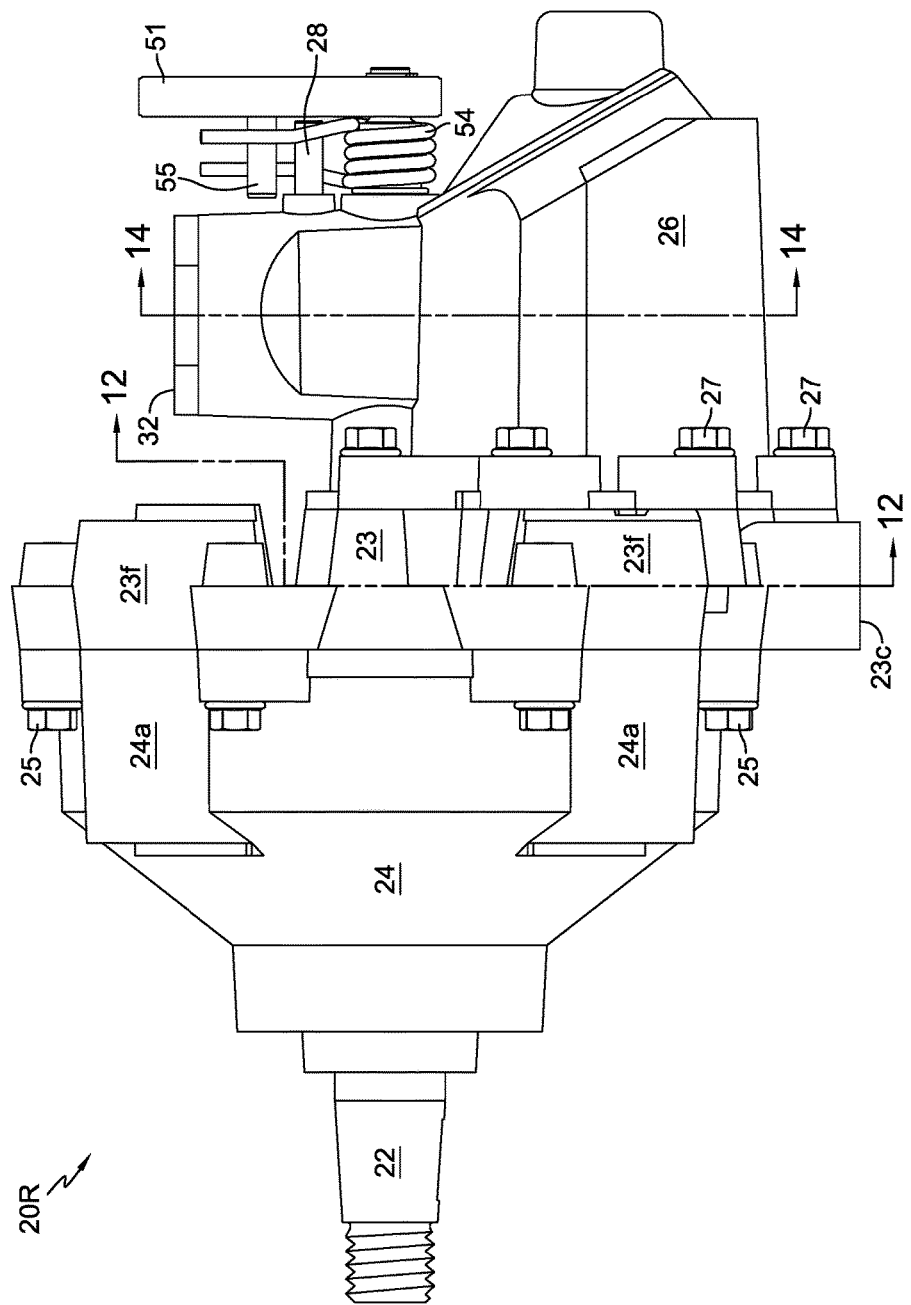
FIG. 11 illustrates a top plan view of the motor assembly shown in FIG. 2.
Figure 12:
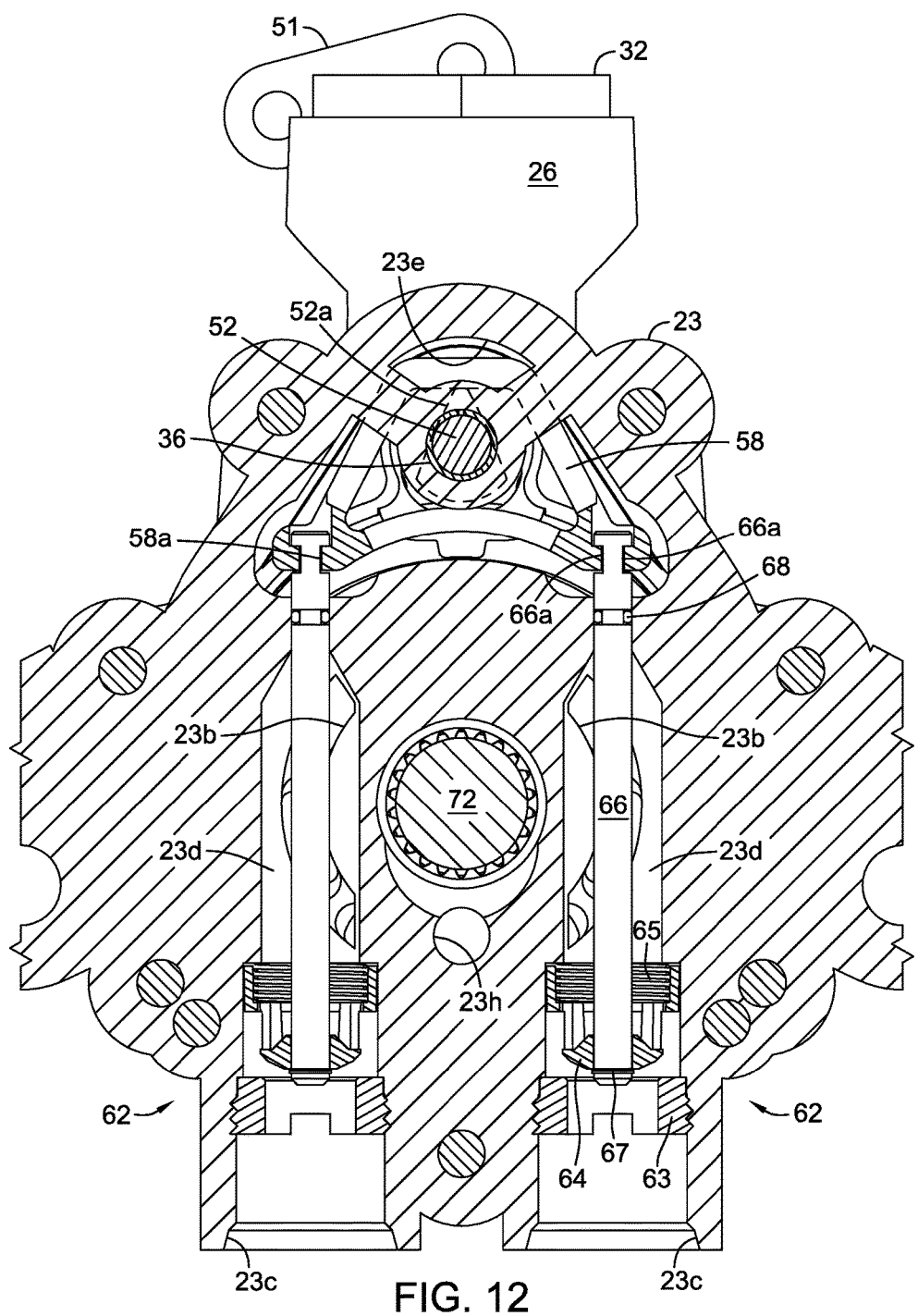
FIG. 12 illustrates a cross-sectional view of the motor assembly shown in FIG. 11, taken along line 12-12, with the dual brake mechanism disengaged.
Figure 13:
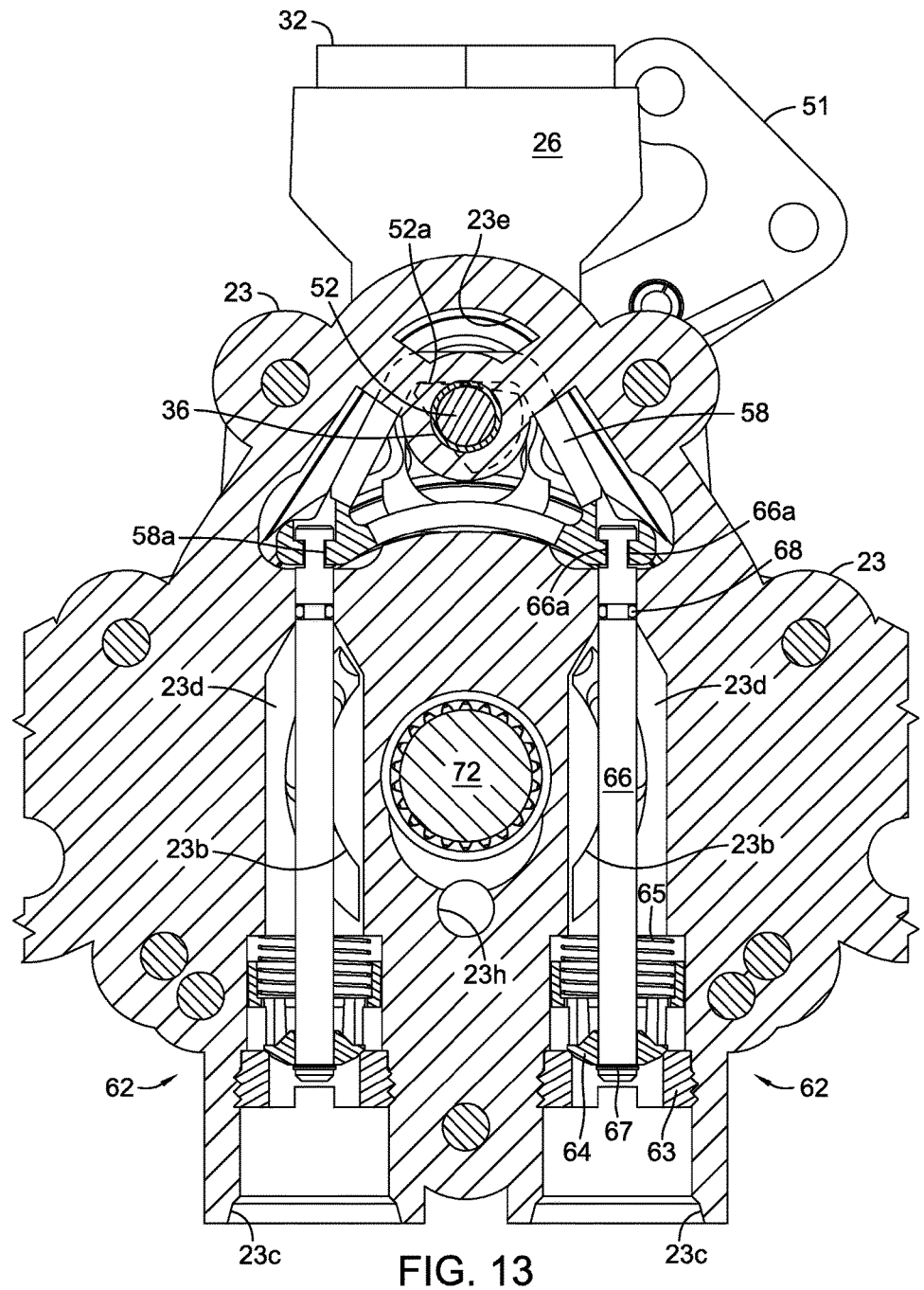
FIG. 13 illustrates a cross-sectional view identical to FIG. 12, except with the dual brake mechanism engaged.

Referring to FIGS. 10 and 12, main housing 23 has system ports 23c that allow hydraulic fluid flow through fluid passages 23d to and from kidney ports 23b. Referring to FIGS. 3, 12, and 13, poppet valve assemblies 62 are disposed in fluid passages 23d such that closure of poppet valve assemblies 62 blocks fluid passages 23d. This blocking of hydraulic fluid flow quickly slows rotation of axial piston motor 40.

Dual brake mechanism 50 is provided to initiate both hydraulic braking and mechanical braking. Dual brake mechanism 50 comprises a brake shaft 52 having an actuator cam 52b that bears against a poppet actuator 58 to affect axial movement of rods 66 to open and close poppet valve assemblies 62. Brake shaft 52 is rotatably supported by shaft bearing surface 26b in cylinder block housing 26 and by optional journal bearing 36 in main housing 23. Poppet actuator 58, disposed in actuator pocket 23e, has a pair of slots 58a. Each slot 58a mates with a notch 66a formed in proximity to one end of each rod 66. A poppet 64 is retained on the opposite end of each rod 66 by a retaining ring 67. Optional O-rings 68 are disposed about rods 66 to seal fluid passages 23d.

Figure 7:
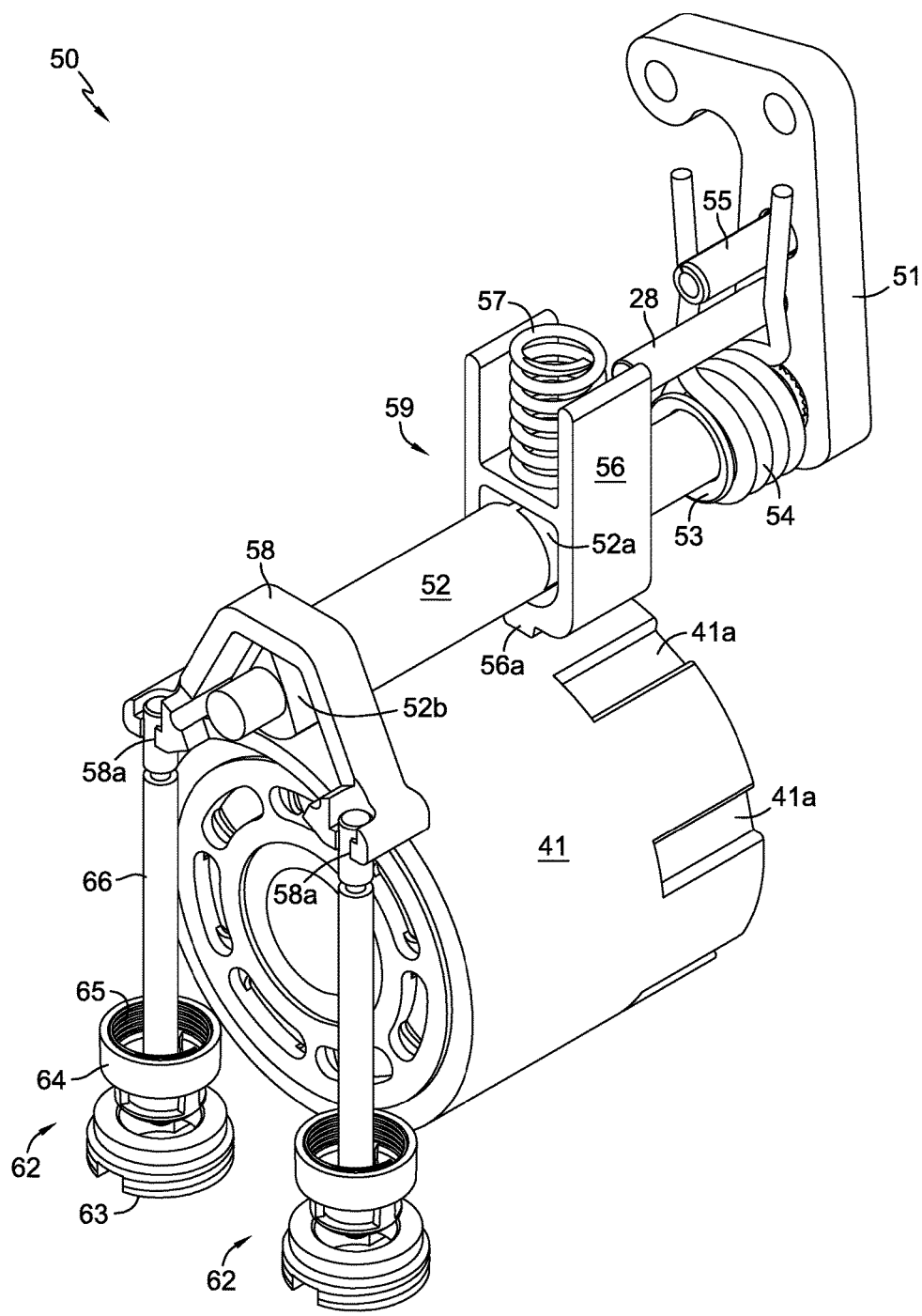
FIG. 7 illustrates a perspective view of the dual brake mechanism of the motor assembly shown in FIG. 3, with the dual brake mechanism disengaged.
Figure 8:
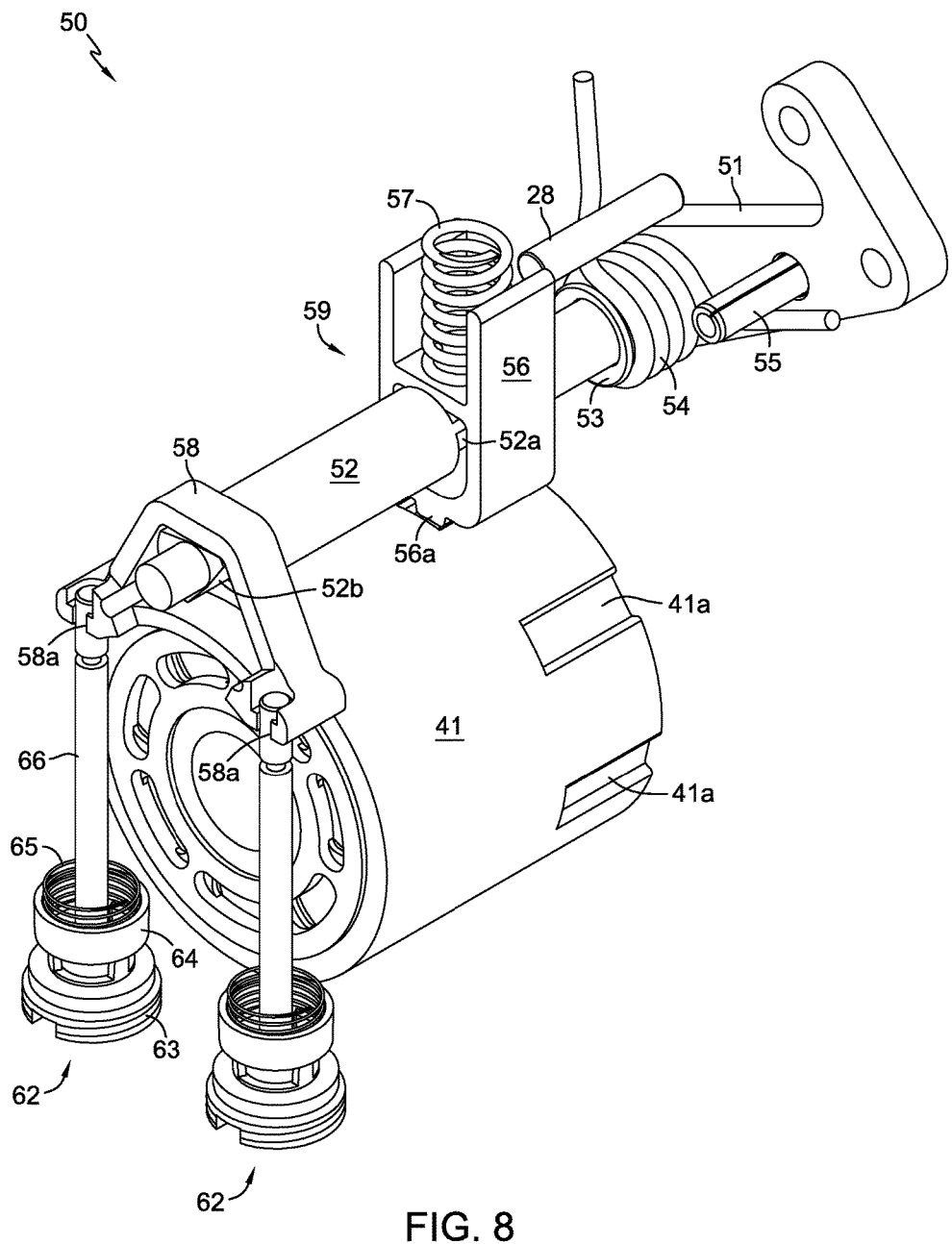
FIG. 8 illustrates a perspective view identical to that of FIG. 7, except with the dual brake mechanism engaged.
Figure 9:
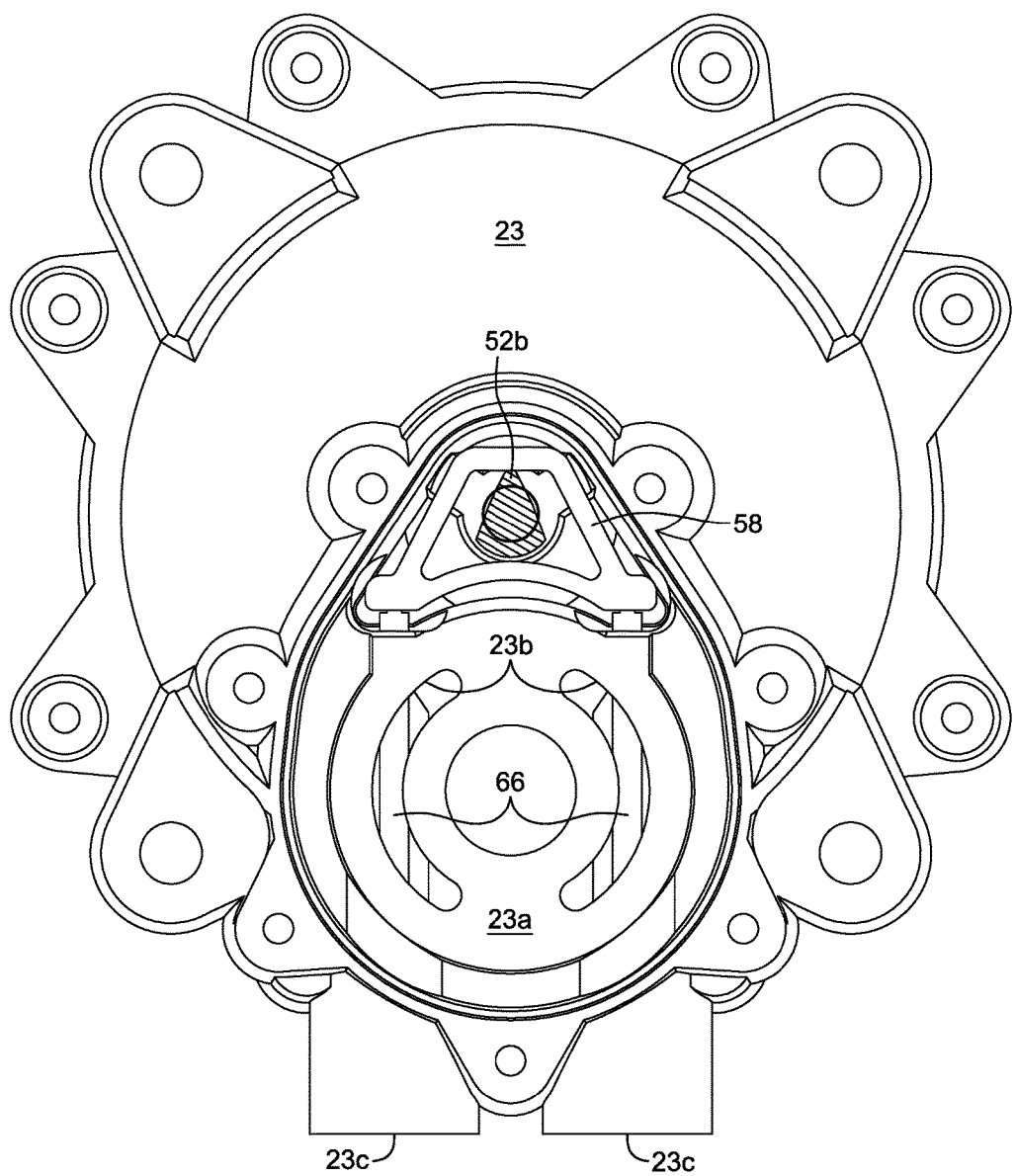
FIG. 9 illustrates an end view of the main housing shown in FIG. 3, and selected additional components to depict relationships, with the dual brake mechanism disengaged and with a cam shown in cross-section.

A brake arm 51 is fixed to an external end of brake shaft 52 and has a first, open (i.e., disengaged) position where dual brake mechanism 50 permits flow of hydraulic fluid through poppet valve assemblies 62 and fluid passages 23d, and a second, closed (i.e., engaged) position where such fluid flow is blocked by seating poppets 64 in poppet seats 63. When brake arm 51 is in the first position as shown in FIGS. 7, 9, and 12, poppet springs 65 are compressed and poppets 64 are separated from poppet seats 63. Thus, hydraulic fluid can flow past poppets 64 and through fluid passages 23d to and from kidney ports 23b and motor pistons 42 can reciprocate. When brake arm 51 is in the second position as shown in, e.g., FIG. 8, springs 65 force poppets 64 to seal against poppet seats 63 and thus, block fluid flow through fluid passages 23d as shown in FIG. 13. This blocked fluid flow substantially restricts rotation of cylinder block 41. Subsequent engagement of cylinder block 41 by a mechanical brake engagement mechanism 59, when cylinder block 41 has slowed sufficiently, then prevents any rotation of cylinder block 41, and therefore, axle 22.

FIGS. 9, 10, 12, and 13 illustrate the comparative positioning of actuator 58 and poppet assembly 62 components during braking. FIGS. 9 and 12 show actuator 58 and poppet assembly 62 components when brake arm 51 is in its first or disengaged position. FIGS. 10 and 13 show the same system after brake arm 51 has been moved to its second or closed position to allow seating of poppets 64 into seats 63.

Brake arm 51 is biased to remain in its first, disengaged position by a torsion spring 54 disposed about sleeve 53 which is, in turn, disposed about a portion of brake shaft 52 extending from cylinder block housing 26. One end of torsion spring 54 is moved by contact with a roll pin 55 that is fixed to brake arm 51 while the opposite end of torsion spring 54 remains in its original position in contact with a pin 28 that is fixed to cylinder block housing 26 so that torsion spring 54 is wound tighter about sleeve 53 when brake arm 51 is rotated from its first position toward its second position.

The mechanical braking feature of dual brake mechanism 50 (i.e., brake engagement mechanism 59) is an optional feature that, as illustrated, is also actuated upon manipulation of brake arm 51. This additional braking feature involves a brake member 56 engaging cylinder block 41 to prevent cylinder block 41 from rotating and can be used in a motor assembly having no hydraulic brake of the invention. Cylinder block brakes are known, as shown in commonly owned U.S. Pat. No. 7,134,276, the terms of which are incorporated herein by reference. The improved mechanical braking feature of the present design will now be discussed in detail.

Figure 14:
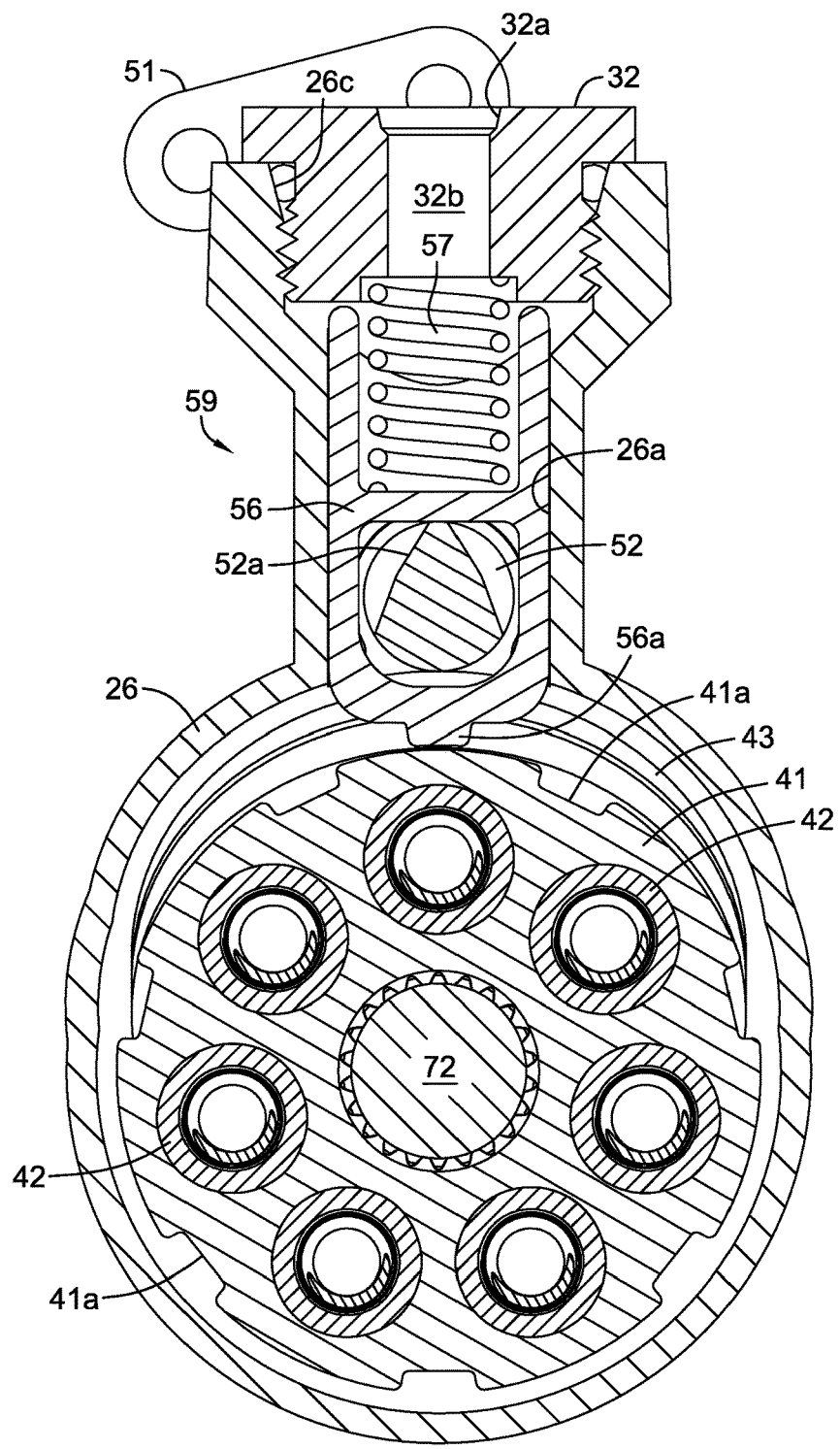
FIG. 14 illustrates a cross-sectional view of the motor assembly shown in FIG. 11, taken along line 14-14, with the dual brake mechanism disengaged.
Figure 15:
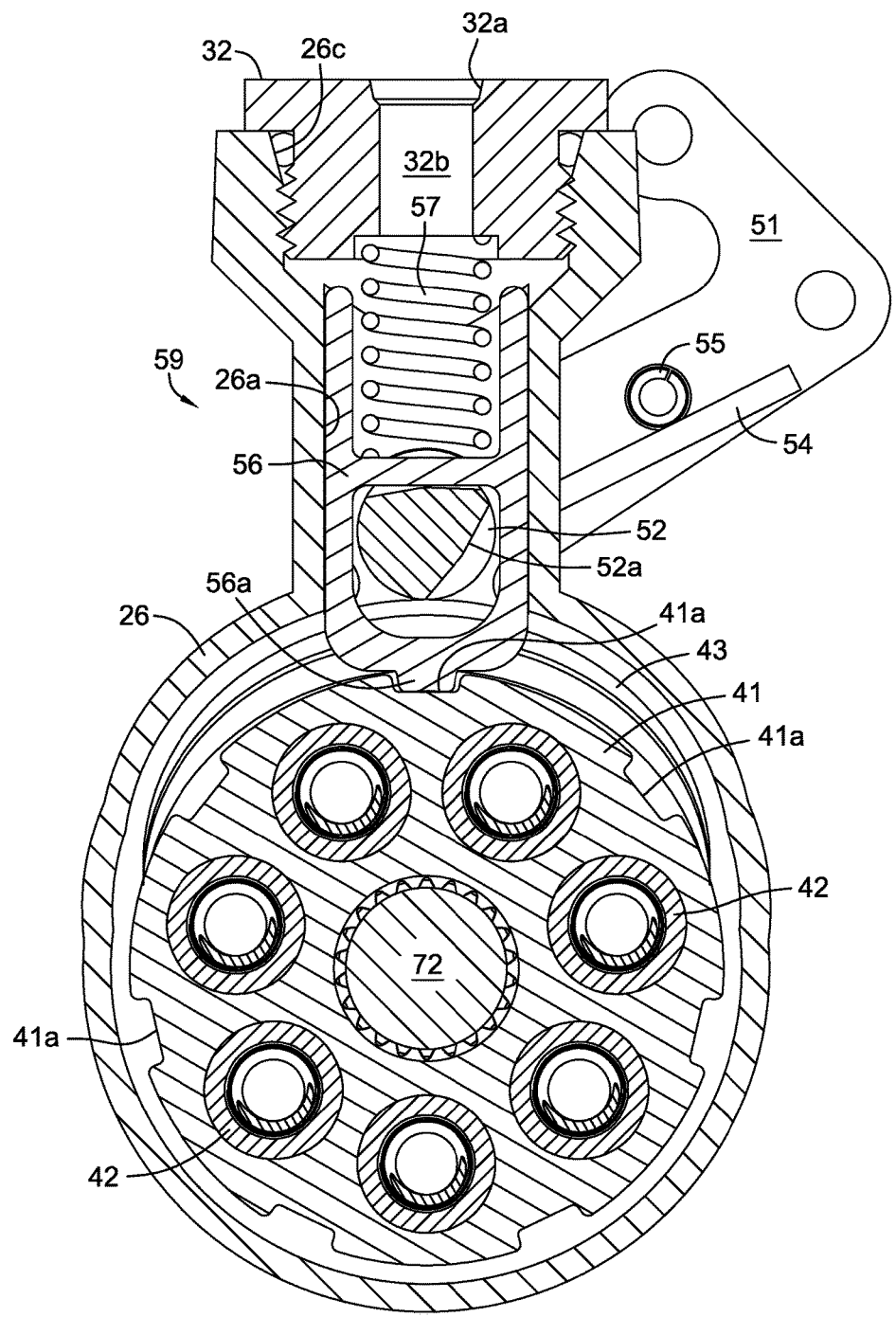
FIG. 15 illustrates a cross-sectional view identical to FIG. 14, except with the dual brake mechanism engaged.

As can be seen in FIGS. 3, 14 and 15, brake shaft 52 also includes a cam 52a that bears against brake member 56. Spring 57 is disposed so that it bears against adapter fitting 32 and brake member 56. When brake arm 51 is in the first, disengaged position, spring 57 is compressed between adapter fitting 32 and brake member 56. When brake arm 51 is moved to the second position, the pressure of spring 57 against brake member 56 causes axial movement of brake member 56 such that protrusion 56a engages cylinder block 41. Such engagement provides mechanical braking of axial piston motor 40 in addition to the hydraulic braking provided by closure of poppet valve assemblies 62 as described above. Cylinder block 41 has recesses 41a that mate with protrusion 56a. Once hydraulic braking of axial piston motor 40 has sufficiently slowed the rotation of cylinder block 41, the force of spring 57 causes protrusion 56a to engage one of recesses 41a and securely brake cylinder block 41.

FIGS. 14 and 15 illustrate the comparative positioning of brake member 56 and protrusion 56a during braking. FIG. 14 shows brake engagement mechanism 59 when brake arm 51 and brake member 56 are each in a first, un-braked position and protrusion 56a is disengaged from cylinder block 41. FIG. 15 shows the same system after hydraulic braking has slowed cylinder block 41 sufficiently to allow protrusion 56a to fully engage one of recesses 41a and, thus, prevent rotation of cylinder block 41.

As shown, e.g., in FIG. 5, motor output shaft 72 is supported in cylinder block housing 26 by bearing 38 at one end and is supported in main housing 23 by bearing 37 proximate to its opposing end. Output shaft 72 is splined to pinion gear 74 which drives ring gear 76. Ring gear 76 is splined to axle 22 proximate to an end of axle 22 that is supported in main housing 23 by bearing 35. The opposing end of axle 22 is supported in axle housing 24 by bearing 34. This arrangement of gears and shafts provides a link between cylinder block 41 and axle 22. Thus, axle 22 is braked when axial piston motor 40 is braked.

Main housing 23 is secured to axle housing 24 by fasteners 25. Axle housing 24 has mounting lugs 24a with openings 24b that mate with openings 23g of main housing mounting lugs 23f to allow mounting of motor assembly 20R to vehicle frame 92.

Motor assembly 20R is a sealed unit with axle housing 24, main housing 23, and cylinder block housing 26 defining a common sump 49. Fluid passages 26d allow hydraulic fluid in sump 49 to flow into brake chamber 26a. Adapter fitting 32 is fixed in port 26c and has case drain port 32a. This allows flow of excess hydraulic fluid from sump 49 through case drain passage 32b and ultimately to reservoir 95 of vehicle 90.

Location of the axes of rotation of motor output shaft 72, axle 22 and brake shaft 52 on a common plane allows motor assembly 20R to be a relatively compact, substantially symmetrical unit.

It is to be understood that the above description of the invention should not be used to limit the invention, as other embodiments and uses of the various features of this invention will be obvious to one skilled in the art. This invention should be read as limited by the scope of its claims only.

The invention claimed is:

1. A hydraulic drive assembly, comprising:
    a housing;
    a cylinder block rotatably disposed in the housing and connected to a hydraulic pump through a porting system;
    an output shaft driven by the cylinder block;
    a hydraulic brake capable of controlling fluid flow between the cylinder block and the hydraulic pump in the porting system;
    a mechanical brake comprising a brake member for braking the cylinder block; and
    a brake shaft capable of simultaneously actuating the hydraulic brake and the mechanical brake.

2. The hydraulic drive assembly of claim 1, wherein the cylinder block comprises a side surface having a plurality of recesses formed therein, and the brake member is movable between a first position where it is disengaged from the cylinder block and a second position where it engages one of the plurality of recesses.

3. The hydraulic drive assembly of claim 1, further comprising a brake arm disposed external to the housing and engaged to the brake shaft.

4. The hydraulic drive assembly of claim 1, further comprising an axle disposed in the housing and a ring gear arrangement driven by the output shaft to drive the axle.

5. The hydraulic drive assembly of claim 4, wherein the brake shaft is coaxial with the axle.

6. The hydraulic drive assembly of claim 4, wherein the housing comprises a main housing, an axle housing secured to one side of the main housing and a cylinder block housing secured to a second side of the main housing.

7. The hydraulic drive assembly of claim 6, wherein one end of the brake shaft extends from the cylinder block housing.

8. The hydraulic drive assembly of claim 6, wherein the porting system comprises hydraulic porting integrally formed in the main housing.

9. The hydraulic drive assembly of claim 8, wherein the brake shaft is coaxial with the axle.

10. The hydraulic drive assembly of claim 9, wherein the brake shaft is parallel to the output shaft.

11. The hydraulic drive assembly of claim 1, wherein the hydraulic brake comprises at least one valve in communication with the porting system.

12. A hydraulic motor assembly, comprising:
    a housing having a hydraulic porting system formed therein and a running surface connected to the hydraulic porting system;
    a motor cylinder block rotatably disposed on the running surface and driving an output shaft;
    an axle driven by the output shaft and extending from one end of the housing;
    a mechanical brake for engaging the motor cylinder block for braking the output of the hydraulic motor assembly;
    a hydraulic brake for controlling flow of the hydraulic fluid in the hydraulic porting system; and
    an actuator that initiates actuation of both the mechanical brake and the hydraulic brake.

13. The hydraulic motor assembly of claim 12, wherein the motor cylinder block has a side surface having a plurality of recesses formed therein, and the mechanical brake comprises a brake member that is placed into engagement with one of the plurality of recesses by the actuator.

14. The hydraulic motor assembly of claim 12, wherein the axle has a first longitudinal axis and the output shaft has a second longitudinal axis that is parallel to and offset from the first longitudinal axis.

15. The hydraulic motor assembly of claim 14, further comprising a first gear disposed on an end of and driven by the output shaft, the first gear engaged to and rotating a ring gear that is connected to and drives the axle.

16. The hydraulic motor assembly of claim 14, wherein the actuator comprises a brake shaft disposed in the housing generally coaxial with the first longitudinal axis and having a first cam which actuates the mechanical brake and a second cam which actuates the hydraulic brake.

17. A vehicle comprising:
    a frame;
    a prime mover disposed on the frame;
    a pair of hydraulic pumps disposed on the frame, each of the pair of hydraulic pumps being driven by the prime mover; and
    a pair of hydraulic drive mechanisms disposed on the frame, wherein each hydraulic drive mechanism provides an output to one of a pair of driven wheels, and each one of the pair of hydraulic drive mechanisms comprises:
- a housing having a porting system formed in the housing, wherein the porting system is connected to one of the pair of hydraulic pumps;
- a motor cylinder block rotatably disposed in the housing and connected to the porting system;
- a hydraulic brake capable of controlling fluid flow in the porting system to provide a braking force to the hydraulic drive mechanism; and
- a mechanical brake comprising a brake member for braking the motor cylinder block.

18. The vehicle of claim 17, wherein each hydraulic drive mechanism further comprises an actuator which simultaneously actuates the respective mechanical brake and the respective hydraulic brake.

19. The vehicle of claim 18, wherein the motor cylinder block of each hydraulic drive mechanism has a side surface with a plurality of recesses formed thereon, and the respective brake member engages one of the plurality of recesses when the respective brake member is actuated.

20. The vehicle of claim 17, wherein each hydraulic drive mechanism comprises an output shaft engaged to and driven by the motor cylinder block, and an axle driven by the output shaft, and each axle is coaxial with its respective brake shaft.

21. The vehicle of claim 20, wherein the housing of each hydraulic drive mechanism comprises a main housing, an axle housing secured to one side of the main housing and a cylinder block housing secured to a second side of the main housing.

* * * * *